No. 819,031. PATENTED APR. 24, 1906.
C. & H. C. BECK.
RANGE FINDER.
APPLICATION FILED JAN. 23, 1906.
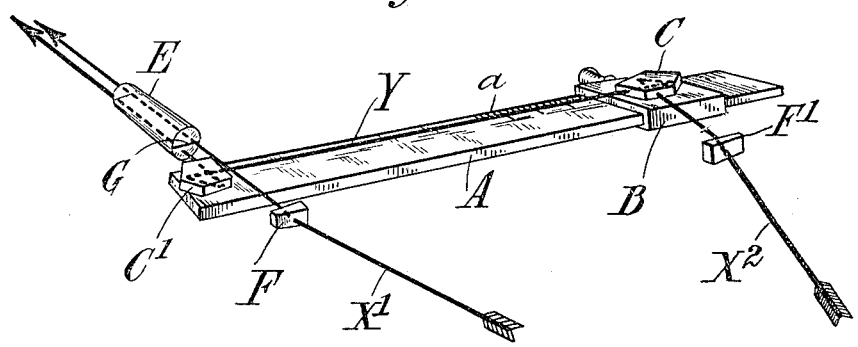
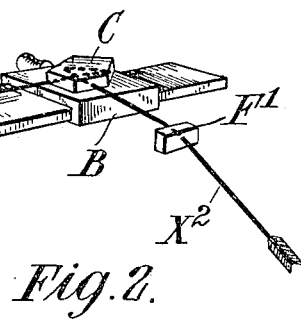

UNITED STATES PATENT OFFICE.

CONRAD BECK AND HORACE COURTHOPE BECK, OF LONDON, ENGLAND, ASSIGNORS TO CONRAD BECK, OF LONDON, ENGLAND, GEORGE MAXWELL LAWFORD, OF WESTMINSTER, ENGLAND, AND DAVID SING CAPPER, OF LONDON, ENGLAND.

RANGE-FINDER.

No. 819,031.     Specification of Letters Patent.     Patented April 24, 1906.

Application filed January 23, 1906. Serial No. 297,506.

*To all whom it may concern:*

Be it known that we, CONRAD BECK and HORACE COURTHOPE BECK, subjects of the King of England, residing in London, England, have invented certain new and useful Improvements in Range-Finders, of which the following is a specification.

Our improvements have reference to range-finders in which the light-receiving elements of two sighting devices are relatively adjustable to and fro on a base member.

Our invention enables a range-finder to be made in which deflection of the cross-bar or base member and also the rocking of the movable element of such a range-finder will not materially affect the accuracy of our results.

By our invention the only accurate measurement that has to be made in the working of the instrument is the distance apart of the two elements on the base-line, and both of the elements may be deflected without materially affecting the accuracy of the result.

In carrying our invention into effect we rigidly fix a telescope or sighting device to one end of the cross-bar or base-line and provide a sliding carriage which may be moved along the cross-bar toward or away from the telescope. This carriage carries a special form of reflecting-prism of such a nature that a pencil of light incident upon the prism at any angle within certain large limits will emerge from the prism at an angle of ninety degrees to its original incident direction, it being understood that the plane of the incident and emergent rays is at right angles to the reflecting-surfaces.

For convenience we call our prisms which have this particular quality of not materially altering the deviation between the incident and reflected light when rotated on an axis parallel to their reflecting-surfaces "isoflexial," and we prefer to make such prisms with approximately the following internal angles, taken in succession: ninety degrees, one hundred and twelve and one-half degrees, forty-five degrees, and one hundred and twelve and one-half degrees; but we do not limit ourselves to this shape, and we can also use two or more mirrors placed at the correct angles instead of a prism—as, for instance, two mirrors with their reflecting-surfaces inclined to one another at forty-five degrees. The invention will, however, be described with reference to isoflexial prisms.

In front of the telescope we fix a mirror or prism at about forty-five degrees to the axis of the telescope or a reflecting right-angle prism. The latter prism or mirror is placed in a line with the prism on the carriage, so that light from a distant object entering the movable or carriage prism will be reflected by such prism onto the fixed mirror or prism and again reflected by this into the telescope. In this arrangement we have an instrument in which it is evident that deflection of the carriage or of the bar along which it travels will not affect the direction of the light or alter the position of the image to any appreciable extent in the telescope. This is the purpose for which the isoflexial prisms or mirrors are employed in range-finders according to this invention.

To render the instrument more convenient, we prefer to use only one telescope, and for this purpose we make the carriage or movable prism and the fixed mirror or prism about half the size of the object-glass of the single telescope, so that one portion of the object-glass admits light from the object and the other portion admits light from the object after it has passed through the carriage or movable prism and the fixed mirror or prism. We place the fixed mirror or prism at an angle slightly different from the forty-five degrees, so as to produce the necessary deviation between the two pictures required to compensate for the base-line difference in angle of the two sets of rays which form the two images of the object being observed. In doing this we prefer to arrange our apparatus in such a manner that the two sets of rays forming the two images enter the object-glass one above the other and not on the right and left hand sides of it, because by this means we are dividing the object-glass on a horizontal and not a vertical line. Such a division will give better resolving power to the telescope in respect to the formation of images of vertical lines in the object than would be the case if the division were made in a vertical direction. This is of importance, because it renders the power of the telescope greater for viewing such objects as the masts of ships, &c., and because the measurements to be made are due to the lateral motion of the two images toward and away from each other. In cases where the range-finder is to be used with the base in other than a horizontal position we divide our telescope object-glass along a line which is parallel to the base-line—*i. e.*, parallel to the direction of the relative adjustment of the elements.

The telescope in this construction will show two images in the same view, which can be brought into juxtaposition; but we can also arrange by placing a thin septum or partition down the telescope-tube and by giving a slight inclination to the fixed mirror or prism about a horizontal axis to produce two images, one above the other, each of which can be alined upon a cross-wire in the focus of the telescope.

The septum may be of any form that will prevent light entering on one side of the axis from emerging onto the other side thereof. In order that the septum may form a very fine line of division at the eyepiece, the septum in the neighborhood of the eyepiece may consist of two glass blocks having two polished surfaces in contact and having also parallel surfaces perpendicular to the said polished surfaces.

This invention removes from the problem the chief factors of error; but it is still requisite that the telescope and its fixed mirror or prism should be attached to one another in a manner which cannot be altered by changes of temperature, torsion or otherwise, and a similar rigidity is necessary between the various parts of the telescope. In order, however, to remove the necessity for satisfying these conditions, we use in place of the fixed reflecting mirror or prism a prism which possesses the same qualities as those possessed by the before-mentioned movable or carriage prism—namely, that it reflects light which enters it at any angle within certain large limits in a direction at ninety degrees to its incident angle. The two isoflexial prisms may be so arranged that the beam of light from the adjustable prism passes also through the fixed prism on its way to the telescope.

In another arrangement two similar and equal isoflexial prisms (*i. e.*, having identical dimensions, composition, &c.) are arranged so that one beam of light from the sighted object passes to the sighting device by way of one prism and that another beam passes to the same sighting device by way of the other prism in order that the two beams shall follow similar and equal courses in the similar and equal prisms, so that any change in the prisms due to temperature shall affect the two beams of light in the same manner and to an equal extent.

When desired—as, for instance, in cases wherein the isoflexial prisms reflect the emergent beam at ninety degrees to the incident beam—we obtain the necessary angle between the direction of those portions of the two beams that extend between the instrument and the object by placing a refracting-prism in the path of each beam, so as to deflect the beams slightly before they enter the sighting device or the isoflexial prism. It is preferable to employ two similar and equal deflecting-prisms in order that the two beams shall follow similar and equal courses in the similar and equal deflecting prisms, the two deflecting-prisms coöperating to produce the necessary relative deviation of the beams. Alternatively we can construct either one or both of the isoflexial prisms so that incident light after passage through such prisms emerges at a constant deviation slightly more or less than ninety degrees from its incident direction.

The accompanying drawings are two diagrams in perspective, illustrating two arrangements of the essential portions of a range-finder according to this invention, Figure 1 showing an arrangement in which the telescope is transverse to the base, and Fig. 2 showing an arrangement in which the telescope is parallel to the base.

The base member is represented by a rigid bar A, divided along its length into a scale $a$, which may conveniently represent the range in yards of the object sighted. The sliding carriage B is adjustable along the bar A, and the position of the carriage on the scale is the index by which the range is measured. An isoflexial prism C is fixed upon the traveling carriage B, which may be rotated for a considerable amount in a horizontal plane without affecting the angle between the incident ray $X^2$ from the object and the emergent ray Y.

Our invention enables the observation to be made by one observer, the telescope E being divided into two halves, so that two images are seen, one above the other, in the same field of view. The isoflexial prism C is so made that the emergent beam Y is at an angle slightly less than ninety degrees to the incident beam $X^2$. A second isoflexial prism C′, equal in width to the object-glass of the telescope E, but only half the depth thereof, is fixed in front of the lower half of the telescope. A deflecting-prism F is placed in front of the upper half of the telescope, and a similar deflecting-prism F′ is placed in front of the isoflexial prism C, and the arrangement is such that the beam $X^2$ from the sighted object passes through the deflecting-prism F′, the isoflexial prism C, and the isoflexial prism C′ into the lower half of the telescope E, while the beam X′ from the sighted object passes through the deflecting-prism F into the upper half of the telescope E, that is divided by a septum G.

Referring to Fig. 2, the two isoflexial prisms C and $C^2$ are placed on different levels, the prism C being on a level with the upper half of the telescope E, while the prism C² is on a level with the lower half of the telescope. The deflecting-prism F is placed on a level with the isoflexial prism C², while prism F' is on a level with prism C. The beam X² from the sighted object after passing through prism F' is reflected by means of the isoflexial prism C into the upper half of the telescope E, and the beam X' from the sighted object after passing through the deflecting-prism F is reflected by the isoflexial prism C² into the lower half of the telescope E, a thin septum G dividing the telescope into two halves to prevent light from one-half entering the other. This septum is preferably continued in the neighborhood of the eyepiece by two glass blocks e, having two polished surfaces in contact, extending in the plane of the septum G in order that the septum may form a very fine line of division next the eyepiece.

A special advantage of the arrangement shown in Fig. 2 is that if due to temperature any temporary change should take place in the angular reflecting power of the isoflexial prisms C C² the two beams of light X² and X' will be affected in an exactly equal manner, as both beams of light pass through exactly similar prisms in an exactly similar course, the necessary deviation in one of the beams of light being produced by the external independent prisms F F', placed in front of the prisms C and C². The two deflecting-prisms F F' are similar and equal, the incident beams X' X² being equally deflected in opposite directions, so as to produce the necessary relative deviation between the beams. The telescope E may be placed, as shown, parallel to the base A, or it may be placed at right angles to the base A if it be found convenient, the light from the prisms C and C² being reflected into the telescope by means of any of the well-known devices, such as mirrors or prisms.

It is to be understood that the details of construction and arrangement may be varied without departing from this invention.

What we claim as our invention, and desire to secure by Letters Patent, is—

1. In a range-finder, the combination of a base member, two similar and equal isoflexial light-receiving elements relatively adjustable to and fro on said member, two similar and equal deflecting-prisms, and a sighting device, all arranged so that one beam of light from the sighted object passes to the sighting device by way of one light-receiving element and one deflecting-prism and that another beam passes to the same sighting device by way of the other light-receiving element and the other deflecting-prism in order that the two beams shall for the purpose described follow similar and equal courses in the similar and equal light-receiving elements and prisms.

2. In a range-finder, the combination of a fixed cross-bar, a fixed telescope on said bar divided longitudinally into two portions, two similar and equal isoflexial prisms relatively adjustable to and fro on said bar, and two similar and equal deflecting-prisms, all arranged so that one beam of light from the sighted object passes to the telescope by way of one isoflexial prism and one deflecting-prism and that another beam passes to the telescope by way of the other isoflexial prism and the other deflecting-prism in order that the two beams shall for the purpose described, follow similar courses in the similar and equal prisms.

3. In a range-finder, the combination of a fixed cross-bar, a fixed telescope on said bar, a septum dividing the telescope longitudinally into two portions and parallel to the cross-bar, two glass blocks in the telescope having two polished surfaces in contact extending in continuation of the septum in the neighborhood of the eyepiece, and two isoflexial prisms relatively adjustable to and fro on said bar and coöperating with the telescope to give the range.

In testimony whereof we have signed our names to this specification in the presence of two subscribing witnesses.

CONRAD BECK.
HORACE COURTHOPE BECK.

Witnesses:
WILLIAM H. BALLANTYNE,
HERBERT D. JAMESON.